W. H. CRISWELL.
COMBINED BUMPER AND LOCKING DEVICE.
APPLICATION FILED FEB. 2, 1920.

1,376,189.

Patented Apr. 26, 1921.

WITNESSES

INVENTOR
WALTER H. CRISWELL.
BY
ATTORNEYS

W. H. CRISWELL.
COMBINED BUMPER AND LOCKING DEVICE.
APPLICATION FILED FEB. 2, 1920.
1,376,189.
Patented Apr. 26, 1921.
3 SHEETS—SHEET 2.
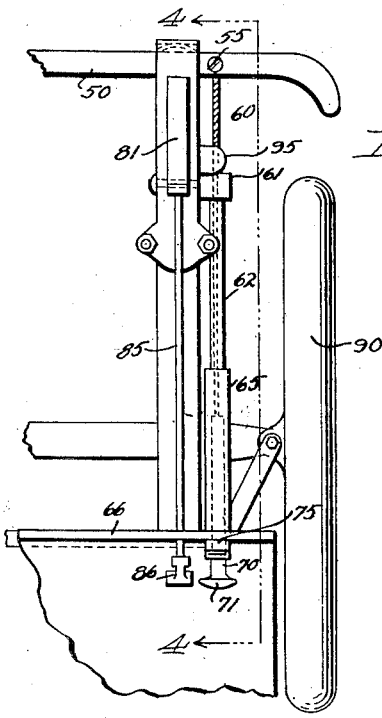
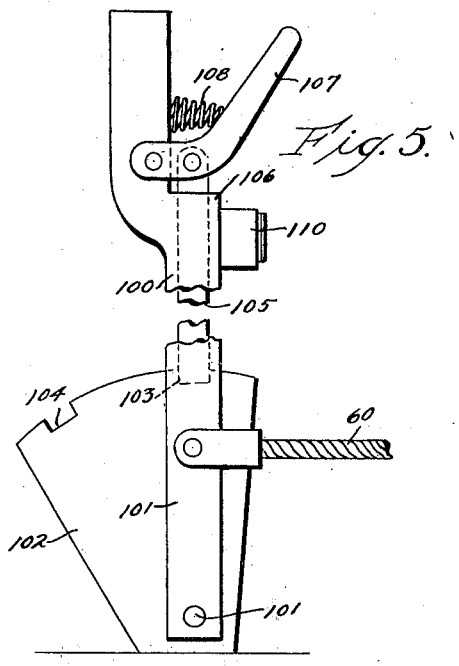
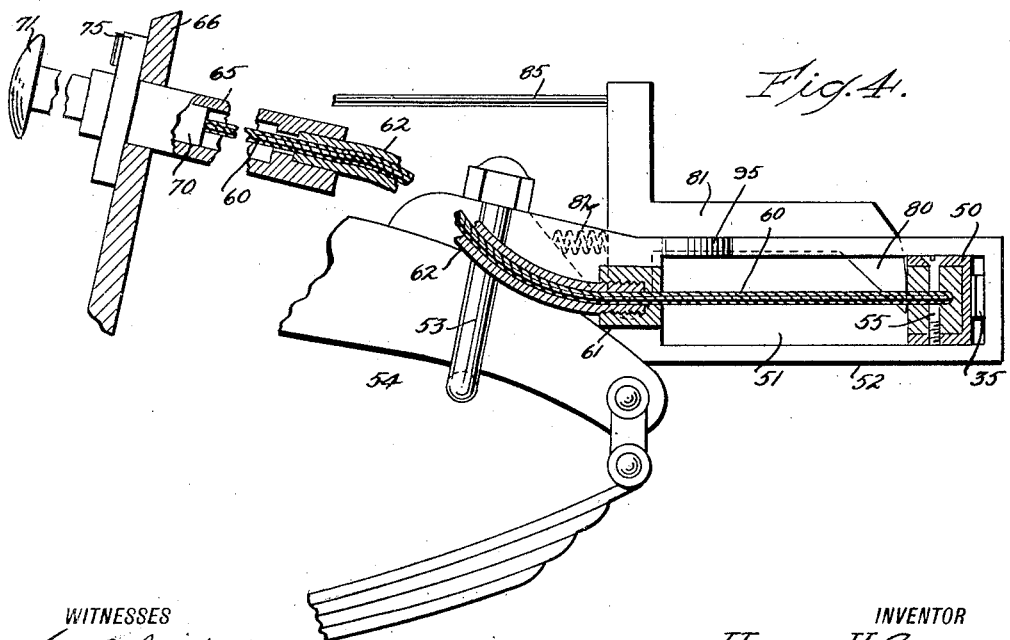
WITNESSES
INVENTOR
WALTER H. CRISWELL.
BY
ATTORNEYS

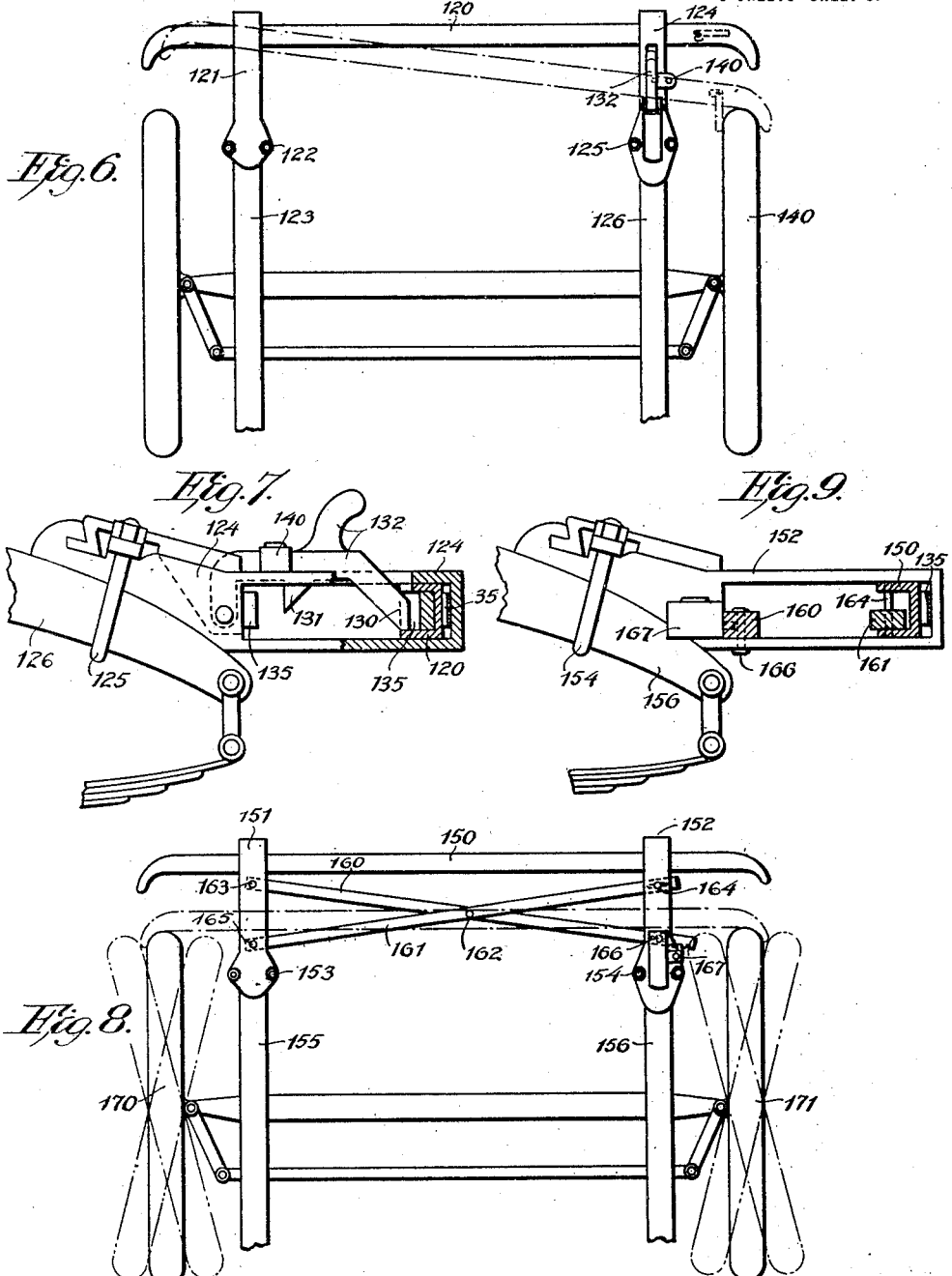

UNITED STATES PATENT OFFICE.

WALTER HUDSON CRISWELL, OF MERLIN, OREGON.

COMBINED BUMPER AND LOCKING DEVICE.

1,376,189.　　　　Specification of Letters Patent.　　Patented Apr. 26, 1921.

Application filed February 2, 1920. Serial No. 355,619.

*To all whom it may concern:*

Be it known that I, WALTER H. CRISWELL, a citizen of the United States, and a resident of Merlin, in the county of Josephine and State of Oregon, have invented a new and Improved Combined Bumper and Locking Device, of which the following is a full, clear, and exact description.

The object of the invention is to provide a new and improved combined bumper and locking device for use on automobiles, autotrucks and other power driven vehicles and arranged to permit the use of the bumper at the front end of the vehicle for the usual bumping purposes or for holding the front or steering wheels in locked position to prevent steering of the vehicle thus guarding against unauthorized persons running away with the vehicle.

Another object is to permit of running the vehicle a short distance out of the way in case of a fire.

Another object is to permit of readily applying the combined bumper and locking device to automobiles and similar power driven vehicles as now generally constructed.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is a plan view of a modified form of the improved combined bumper and locking device;

Fig. 4 is an enlarged sectional side elevation of the same on the line 4—4 of Fig. 3;

Fig. 5 is an enlarged side elevation of a modified form of the actuating and locking device for the bumper bar;

Fig. 6 is a plan view of a modified form of the improved bumper and locking device as applied to the front end of an automobile;

Fig. 7 is an enlarged side elevation of the same with the parts shown in section;

Fig. 8 is a plan view of another modified form of the improved bumper and locking device as applied to the front end of an automobile; and Fig. 9 is a sectional side elevation of the same.

Figure 1:
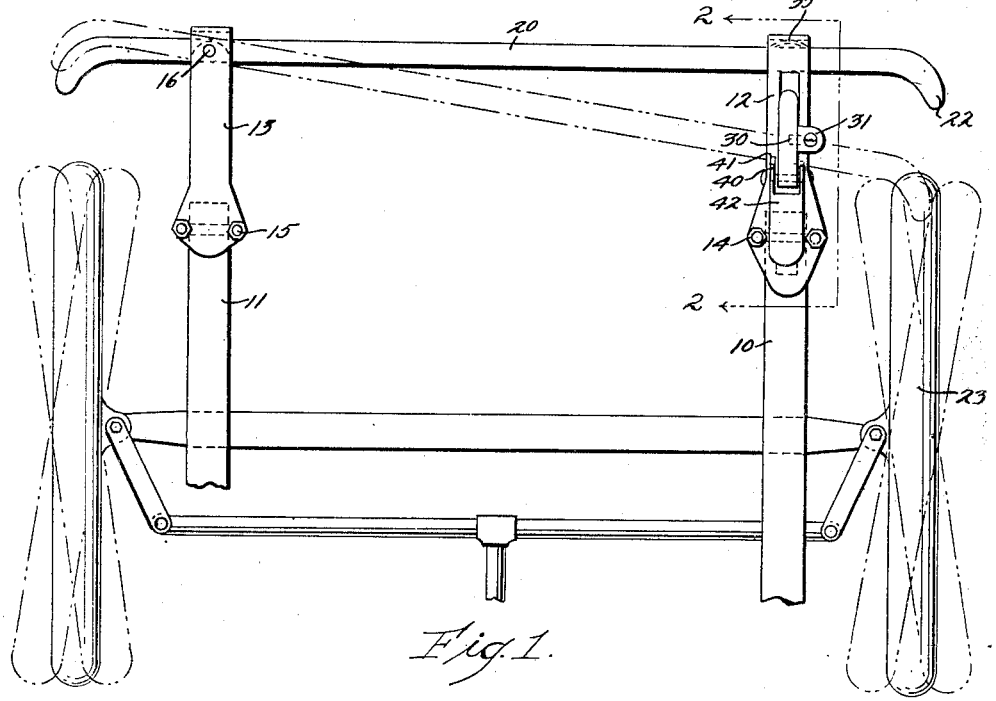
Figure 1 is a plan view of the improved bumper and locking device as applied to the front end of an automobile.

On the forward end of the side beams 10 and 11 of the chassis of an automobile are secured brackets 12 and 13 by the use of clips 14 and 15 or other suitable fastening means. On the outer end of the bracket 13 is arranged a pivot 16 on which is mounted to swing one end of a bumper bar 20 extending with its other end through a guideway 21 formed in the bracket 12. Normally the bumper bar 20 is held in bumping position, that is, at a right angle relative to the longitudinal axis of the automobile. The bumper bar 20 is adapted to swing rearwardly into the position shown in dotted lines in Fig. 1 so that the free curved end 22 of the bumper bar 20 engages one of the steering wheels 23 at the time the steering wheels are in either of the angular positions indicated in dotted lines in Fig. 1. It will be noticed that when the bumper bar 20 is in this locking position relative to the steering wheel 23 then the steering gear is rendered inactive and the automobile cannot be run along a straight path. It will also be noticed that when the bumper bar 20 is in this angular locking position relative to the steering wheel 23 then an unauthorized person cannot run away with the vehicle, but at the same time the vehicle can be run a short distance from its stopping place to be out of the way in case of a fire at or adjacent the stopping place.

The bumper bar 20 is locked when in bumping position or when in locking position, and for this purpose use is made of a latch 25 fulcrumed at 26 on the bracket 12 in the rear of the guideway 21. The latch 25 is provided with two locking lugs 27 and 28 adapted to pass into the guideway 21, as plainly indicated in Fig. 2. When the bumper bar 20 is in normal bumping position then the lug 27 engages the rear of the bumper bar 20 thus locking the latter against swinging movement, and when the bumper bar 20 is in rearmost position, as indicated in dotted lines in Figs. 1 and 2, then the other lug 28 engages the front of the bumper bar 20 and thus locks the same in the angular locking position. The latch 25 is provided with a suitable handle 29 to permit the operator in charge of the vehicle to swing the latch 25 upward out of locking position or downward into the locking position shown in Fig. 2. When the latch 25 is in locking position with the bumper bar 20 engaging the lug 27 or 28, as above explained, then the latch is locked in place by the bolt 30 of a suitable key-controlled lock 31 mounted on the bracket 12.

Figure 2:
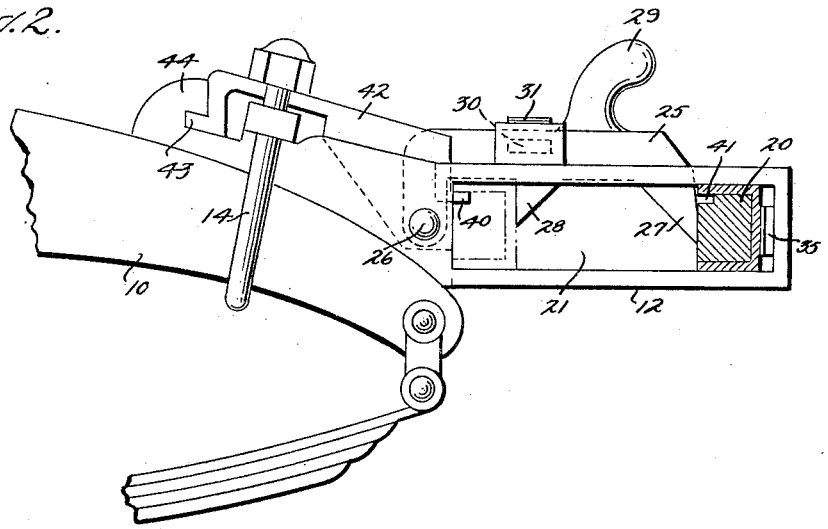
Fig. 2 is an enlarged sectional side elevation of the same on the line 2—2 of Fig. 1.

It is understood that when the bumper bar 20 is in bumping position, as shown in full lines in Figs. 1 and 2, then the bumper bar is locked in this position by the lug 27 of the latch 25 locked in place by the bolt 30 of the lock 31. When it is desired to lock the automobile against being stolen then the operator turns the steering gear until the steering wheels are in either of the angular positions indicated in dotted lines in Fig. 1, and then the operator unlocks the latch 25 and swings the same upward to move the lugs 27 and 28 out of the guideway 21. The operator now swings the bumper bar 20 rearwardly until it abuts against the rear wall of the guideway 21, and then the operator swings the latch 25 downward to engage the lug 28 with the front of the bumper bar 20, as indicated in dotted lines in Fig. 2. The latch 25 is now again locked in place by the bolt 30 of the lock 31 and hence the locked bumper bar 20 holds the steering wheel 23 against being turned back to normal straight ahead position.

In order to prevent rattling of the bumper bar 20 when in bumping position, use is made of a spring 35 held on the bracket 12 and interposed between the front end of the guideway 21 and the front face of the bumper bar 20. In order to prevent the bumper bar 20 from being bodily removed from the brackets 12 and 13 at the time the bumper bar is in locking position, use is made of lugs 40 adapted to engage recesses 41 formed in the rear face of the bumper bar 20 at the time the latter is in locking position. The lugs 40 are formed on the forward end of a bar 42 held on top of the rear portion of the bracket 12 intermediate the side arms of the cleat 14, and the rear end of the bar 42 is provided with a lug 43 engaging a keeper 44 formed on the rear portion of the bracket 12, thus holding the bar 42 against removal by an unauthorized person.

In the modified form shown in Figs. 3 and 4, the free end of the bumper bar 50 is mounted to slide in a guideway 51 formed in a bracket 52 attached by a clip 53 or other fastening means to the corresponding side beam 54 of the chassis of the automobile. The free end of the bumper bar 50 is provided with a bolt 55 on which is fastened the forward end of a cable or other connection 60 extending rearwardly through a bearing 61 and through a tube 62 fastened at its forward end to the bearing 61 which latter is in turn fastened to the rear portion of the bracket 52. The rear end of the tube 62 is secured to a bearing 65 fastened to the dashboard 66 of the automobile, and the rear end of the cable 60 is attached to a slide 70 mounted to slide in the bearing 65 and terminating in a handle 71 under the control of the operator in charge of the automobile. A key-controlled or other lock 75 is mounted on the dashboard 66 and is adapted to engage and lock the slide 70 when the latter is in rearmost position. The bumper bar 50 is held locked when in normal bumping position by a lug 80 formed on the free end of a latch 81 fulcrumed on the bracket 52 and pressed on by a spring 82 so as to normally hold the latch 81 in locking position, that is, with the lug 80 in engagement with the rear face of the bumper bar 50. The latch 81 is connected by a cable, rod, or other connection 85 with a pedal or other device under the control of the operator in charge of the machine to enable the operator to unlock the bumper bar 50, without leaving the automobile, by swinging the catch 81 upward into unlocking position. After this has been done, the operator pulls on the handle 71 thus causing the cable 60 to swing the bumper bar 50 into rearward locking position relative to the corresponding steering wheel 90 of the automobile. When the bumper bar 50 is in this locking position the lock 75 is actuated to lock the slide 70 in place in the bearing 65 thus locking the bumper bar 50 in locking position relative to the wheel 90. When the bumper bar 50 is locked in rearmost position the bolt 55 is covered by a projection 95 formed on the outer side of the bracket 52 thus preventing an unauthorized person from removing the bolt 55 and the pivot 16 at the other side of the bumper bar for removal of the latter.

Instead of controlling the cable 60 by the slide 70 and the lock 75, use may be made of the arrangement illustrated in Fig. 5. In this case the rear end of the cable or other connection 60 is connected with a lever 100 fulcrumed at 101 on a segment 102 attached to the front of the automobile body in the rear of the dashboard 66. The segment 102 is provided with two notches 103 and 104 adapted to be engaged by a bolt 105 mounted to slide in a suitable bearing 106 arranged on the upper portion of the hand lever 100. The upper end of the bolt 106 is pivotally connected with a small hand lever 107 fulcrumed on the upper end of the hand lever 100 and pressed on by a spring 108 to hold the bolt normally in engagement with either of the notches 103 and 104, according to the position in which the hand lever 100 is moved at a time. When the bolt 105 is in the locking position on the segment 102 then it can be locked against movement by the use of a suitable key or otherwise controlled lock 110 mounted on the hand lever 100 and adapted to engage the bolt 105. By the arrangement described, the bumper bar 50 is locked when in normal bumping position or in angular locking position relative to the steering wheel 90.

In the modified form shown in Figs. 6 and 7, the bumper bar 120 has the left end mounted to slide sidewise in a bracket 121 fastened by a clip 122 to the side beam 123 of the chassis. The right end of the bumper bar 120 is mounted to slide forward or backward in a guideway 124 fastened by a clip 125 to the side beam 126 of the chassis. The right end of the bumper bar 120 is adapted to be locked in either a forward or a rearward position by lugs 130, 131 formed on a latch 132 similar to the latch 25 above referred to and adapted to be locked in place by a lock 133. The bumper bar is provided with a notch 135 adapted to be engaged by the lug 130 or by a lug 136 on the rear wall of the guideway 124 to hold the bumper bar 120 against sidewise movement in the bracket 121 or the guideway 124 as long as the latch 132 is in locking position. By reference to Fig. 6, it will be noticed that the right end of the bumper bar 120 is adapted to engage the peripheral face of the front wheel 140 to lock the latter against turning. Normally the bumper bar is in bumping position as shown in full lines.

In the modified form shown in Figs. 8 and 9, the bumper bar 150 is mounted to slide forward or backward in guideways 151 and 152 fastened by clips 153 and 154 to the side beams 155 and 156 of the chassis. A pair of crossed levers 160 and 161 are pivotally connected with each other at 162 and are pivotally connected at their outer ends at 163 and 164 with the bumper bar 150 and at their inner ends 165 and 166 with the brackets 151 and 152. A lock 167 held on the bracket 152 serves to lock the lever 160 in either extended or in folded position. It will be noticed that when the levers 160 and 161 are in extended position, as shown in full lines in Fig. 8, then the bumper bar 150 is in bumping position, and when the levers 160 and 161 are moved into folded position then the bumper bar 150 is moved bodily rearward and with its ends in engagement with the peripheral faces of the front wheels 170 and 171 (see dotted line position, Fig. 8) to lock both the wheels 170 and 171 against turning.

It will be noticed that the combined bumper and locking device shown and described can be readily applied to automobiles, auto-trucks and similar power driven vehicles as now generally constructed, and it is expressly understood that the bumper bar serves the double purpose of a bumper guard and a locking means, to render the steering gears of the automobile inoperative for the time being.

It is understood that I do not limit myself to the particular device shown and described, as the same may be varied without deviating from the spirit of my invention.

Having thus described my invention, I claim as new and desire to secure by Letters Patent:—

1. In a power driven vehicle, a movable bumper, and means to lock the bumper in forward bumping position or in rearward locking position relative to at least one of the steering wheels of the vehicle to render the steering wheel inoperative.

2. In a power driven vehicle, a movable bumper bar, means held on the vehicle and on which the bumper bar is mounted to allow of moving the bumper bar into forward bumping position or rearward into locking position relative to the front wheels of the vehicle, and locking means locking the bumper bar in either forward or rearward position.

3. In a power driven vehicle, a movable bumper bar adapted to be moved into bumping or wheel locking position, steering wheels of which one is adapted to be engaged by one end of the bumper bar at the time the said steering wheels are in angular side steering position, to hold the wheels against being returned to straight ahead position, and locking means adapted to engage the bumper bar to lock the same in either bumping or wheel locking position.

4. In a power driven vehicle, a bumper bar pivoted near one end, actuating means connected with the said bumper bar to swing the latter from normal bumping position into angular locking position to engage one end of the bumper bar with one of the steering wheels of the vehicle, and locking means adapted to engage the bumper bar to lock the latter in either bumping or locking position.

5. In a power driven vehicle, a bumper bar pivoted near one end, actuating means under the control of the driver of the vehicle and connected with the said bumper bar to move the latter from normal bumping position into angular locking position relative to one of the front or steering wheels, and a locking device under the control of the driver and adapted to engage and lock the said bumper bar when in bumping or when in locking position.

6. In a power driven vehicle, spaced brackets attached to the front end of the chassis, a bumper bar pivoted on one of the brackets and slidingly engaging the other bracket, and a lock controlled locking member mounted on the said bracket and adapted to engage the said bumper bar to lock the latter either when in normal bumping position or when in angular locking position relative to one of the steering wheels of the vehicle.

7. In a power driven vehicle, spaced brackets attached to the front of the chassis, a bumper bar pivoted on one of the brackets, the other bracket having a guideway slidingly engaged by the free end of the said bumper bar, a latch mounted on the said guideway bracket and adapted to engage and lock the said free end of the bumper bar in place in either bumping or locking position of the bumper bar, and a lock mounted on the said guideway bracket and adapted to engage the said latch to lock the latter in place on the guideway bracket.

8. In a power driven vehicle, spaced brackets attached to the front of the chassis, a bumper bar pivoted on one of the brackets, the other bracket having a guideway slidingly engaged by the free end of the said bumper bar, a latch mounted on the said guideway bracket and adapted to engage and lock the said free end of the bumper bar in place in either bumping or locking position of the bumper bar, operating means within convenient reach of the driver of the vehicle and connected with the said latch to actuate the latter, and operating means within reach of the driver and connected with the said bumping bar to move the latter from normal bumping position into angular or locking position or vice versa.

9. In a power driven vehicle, spaced brackets attached to the front end of the chassis, a bumper bar pivoted on one of the brackets and slidingly engaging the other bracket, a lock controlled locking member mounted on the said bracket and adapted to engage the said bumper bar to lock the latter either when in normal bumping position or when in angular locking position relative to one of the steering wheels of the vehicle, and a fixed retaining device engaged by the bumping bar at the time the latter moves into locking position to hold the bumping bar against removal.

WALTER HUDSON CRISWELL.